(12) United States Patent
Tanigawa et al.

(10) Patent No.: US 8,305,973 B2
(45) Date of Patent: Nov. 6, 2012

(54) MOBILE COMMUNICATION SYSTEM, BASE STATION DEVICE, MOBILE STATION DEVICE, AND MOBILE COMMUNICATION METHOD

(75) Inventors: Hironobu Tanigawa, Yokohama (JP); Yasuhiro Nakamura, Yokohama (JP); Nobuaki Takamatsu, Yokohama (JP)

(73) Assignee: Kyocera Corporation, Kyoto (JP)

( * ) Notice: Subject to any disclaimer, the term of this patent is extended or adjusted under 35 U.S.C. 154(b) by 710 days.

(21) Appl. No.: 12/375,199

(22) PCT Filed: Jul. 26, 2007

(86) PCT No.: PCT/JP2007/064709
§ 371 (c)(1),
(2), (4) Date: Jul. 2, 2009

(87) PCT Pub. No.: WO2008/013241
PCT Pub. Date: Jan. 31, 2008

(65) Prior Publication Data
US 2009/0303945 A1 Dec. 10, 2009

(30) Foreign Application Priority Data
Jul. 28, 2006 (JP) ................ P2006-206022

(51) Int. Cl.
*H04W 4/00* (2009.01)
(52) U.S. Cl. ...................................... 370/329
(58) Field of Classification Search .................... 370/329
See application file for complete search history.

(56) References Cited

U.S. PATENT DOCUMENTS

| | | | | |
|---|---|---|---|---|
| 7,310,301 | B1 * | 12/2007 | Kleider et al. | 370/203 |
| 7,586,890 | B2 * | 9/2009 | Putzolu | 370/344 |
| 7,616,593 | B2 * | 11/2009 | Jung et al. | 370/310 |
| 2003/0236080 | A1 | 12/2003 | Kadous et al. | 455/226.1 |
| 2006/0153227 | A1 * | 7/2006 | Hwang et al. | 370/465 |
| 2007/0002958 | A1 | 1/2007 | Chang et al. | 375/260 |

(Continued)

FOREIGN PATENT DOCUMENTS

JP 2005-535167 11/2005

(Continued)

OTHER PUBLICATIONS

3GPP TSG-RAN WG1 LTE Ad Hoc Meeting, L1/L2 Control Channel Structure for E-UTRA Downlink R1-060032, Jan. 23-25, 2006, pp. 1-9.*

(Continued)

*Primary Examiner* — Gary Mui
*Assistant Examiner* — Faisal Choudhury
(74) *Attorney, Agent, or Firm* — DLA Piper LLP (US)

(57) ABSTRACT

A base station device (10) performs communications with multiple mobile station devices (20) by the OFDMA scheme. The base station device (10) includes an intra-frame region specifying unit (16) configured to specify a region in a downlink frame to be specified by at least the sub-channel and a transmitter (13) configured to transmit MAP region information indicating the specified downlink intra-frame region. The intra-frame region specifying unit (16) specifies a region in a frame that is to contain communication data. The base station device (10) further includes a MAP generator (121) configured to generate MAP indicating the specified intra-frame region, and the transmitter (13) transmits a downlink frame containing the generated MAP in all or a part of the downlink intra-frame region specified by the MAP region information.

4 Claims, 5 Drawing Sheets

U.S. PATENT DOCUMENTS

| | | | |
|---|---|---|---|
| 2007/0002977 A1 | 1/2007 | Cho et al. | 375/340 |
| 2007/0053456 A1* | 3/2007 | Kim | 375/260 |
| 2007/0060145 A1* | 3/2007 | Song et al. | 455/445 |
| 2007/0060146 A1* | 3/2007 | Won et al. | 455/445 |
| 2007/0223603 A1 | 9/2007 | Honda et al. | 375/260 |
| 2007/0286127 A1* | 12/2007 | Inohiza | 370/331 |

FOREIGN PATENT DOCUMENTS

| | | |
|---|---|---|
| JP | 2007-006503 | 1/2007 |
| JP | 2007-020173 | 1/2007 |
| JP | 2007-243488 | 9/2007 |
| JP | 2007-259326 | 10/2007 |
| WO | WO 2005/088871 A1 | 9/2005 |
| WO | WO 2005/088873 A1 | 9/2005 |

OTHER PUBLICATIONS

"L1/L2 Control Channel Structure for E-UTRA Downlink" 3GPP TSG-RAN WG1 LTE Ad Hoc Meeting, Hislinki, Finland, Jan. 23-25, 2006 pp. 1-9.

Chinese language office action dated Nov. 2, 2011 and its English language translation for corresponding Chinese application 200780028396.9.

* cited by examiner

MOBILE COMMUNICATION SYSTEM, BASE STATION DEVICE, MOBILE STATION DEVICE, AND MOBILE COMMUNICATION METHOD

TECHNICAL FIELD

The present invention relates to a mobile communication system, a base station device, a mobile station device, and a mobile communication method, and particularly relates to a technology for reducing processing of mobile station devices in a mobile communication system of OFDMA (Orthogonal Frequency Division Multiple Access) scheme.

BACKGROUND ART

One of radio communication methods utilized in a mobile communication system is the OFDMA scheme. In the OFDMA scheme, carriers assigned to each base station are divided into multiple subcarriers which are orthogonal to each other. Further, the subcarriers are grouped by a predetermined number. The groups are referred to as sub-channels.

A frame of the OFDMA scheme is formed of multiple sub-channels. A region in the frame is specified by a combination of one or more sub-channels and symbols. A communication device (such as a mobile station device or a base station device) that attempts to transmit communication data transmits communication data by selectively using an intra-frame region (See Patent Document 1, for example).

In the mobile communication system, intra-frame regions to be respectively used by the base station device and the mobile station device for transmitting communication data, are both determined by the base station device. In order to notify the mobile station device of content of the determination, the base station device utilizes information called MAP. The MAP is intra-frame region specifying information for specifying a region in a frame that the base station device or the mobile station device uses for transmitting the communication data.

The base station device notifies the mobile station device of the MAP. From the notified MAP, the mobile station device recognizes an intra-frame region containing communication data that the base station device has transmitted to the mobile station itself, and an intra-frame region that the mobile station device will use when transmitting the communication data to the base station device. The notification of the MAP in WiMAX, which is one of the mobile communication systems adopting the OFDMA scheme, will be described in detail hereinafter.

Figure 5:
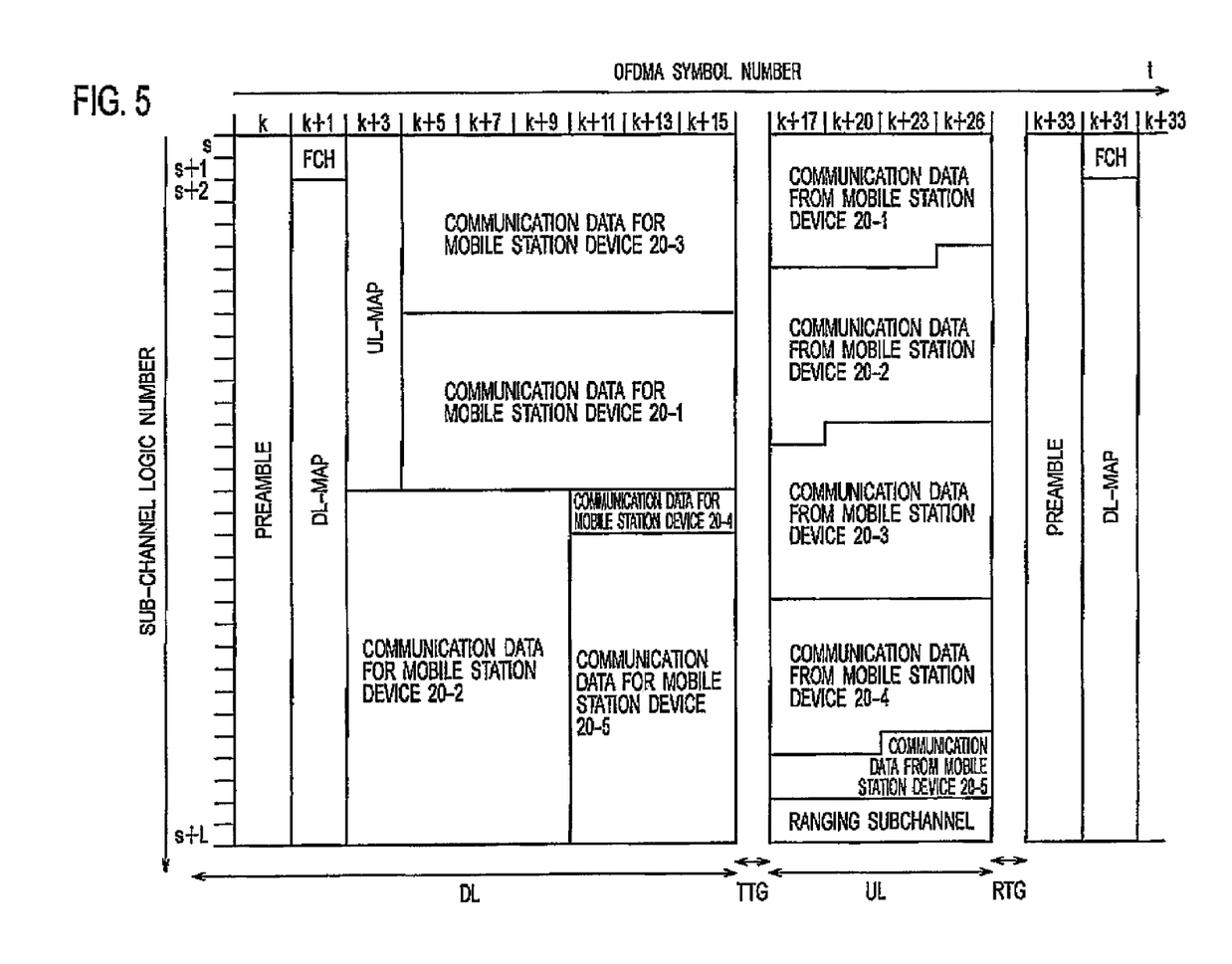
FIG. 5 is a diagram showing an example of a frame configuration of WiMAX.

FIG. 5 is a diagram showing an example of a frame configuration of the WiMAX. As shown in FIG. 5, in addition to the OFDMA scheme, the TDD (Time Division Duplex) scheme is adopted in the WiMaX, and a frame is divided into a downlink frame (DL) and an uplink frame (UL) according to time. The DL and UL are transmitted alternately. A frame consists of a DL and an UL following the DL. The MAP of the WiMAX contains intra-frame region specifying information for all mobile station devices which are in communication with the base station device. The base station device transmits the MAP by containing it in a specifying region of the DL (a leading part of the DL in FIG. 5).

When receiving the DL, the mobile station device first refers to the specifying region in the DL described above, and acquires the MAP contained in the specifying region. Then, the mobile station device retrieves MAP for the mobile station device itself from the acquired MAP. Next, according to DL-MAP of the MAP for the mobile station device itself, the mobile station device acquires an intra-frame region in the DL where communication data addressed to the mobile station device itself exists. Similarly, according to UL-MAP, the mobile station device acquires an intra-frame region in the UL that may contain communication data to be transmitted.

Patent Document 1: Japanese Patent Translation Publication No. 2005-535167, paragraph 0017

DISCLOSURE OF THE INVENTION

However, in the WiMAX described above, an intra-frame region containing intra-frame region specifying information is not specified for every mobile station device. Thus, the mobile station device needs to acquire MAP for all mobile station devices once, and then acquire its own MAP from the acquired MAP for all mobile station devices. Accordingly, processing performed at the mobile station devices is slowed.

Hence, one of the objects of the present invention is to provide a mobile communication system, a base station device, a mobile station device, and a mobile communication method that are capable of achieving reduction of the processing of the mobile station device in a mobile communication system of OFDMA scheme.

A mobile communication system for achieving the above object according to the present invention is a mobile communication system in which a base station device and a plurality of mobile station devices perform communications by using a frame containing a downlink frame consisting of a plurality of sub-channels, wherein the base station device comprises: a downlink intra-frame region specifying unit configured to specify a region in the downlink frame to be specified by at least the sub-channel for each of the plurality of mobile station devices; a downlink intra-frame region information transmitter configured to transmit to each of the mobile station device, the downlink intra-frame region information indicating a region in the downlink frame specified by the downlink intra-frame region specifying unit; a communication data region specifying unit configured to specify a region in the frame that is to contain the communication data, for each of the plurality of mobile station devices; an intra-frame region specifying information generator configured to generate intra-frame region specifying information indicating the intra-frame region specified by the communication data region specifying unit; and a downlink frame transmitter configured to transmit a downlink frame containing the intra-frame region specifying information, which is generated by the intra-frame region specifying information generator, in all or a part of the downlink intra-frame regions specified by the downlink intra-frame region specifying unit, and each of the mobile station devices comprises: a downlink intra-frame region information receiver configured to receive the downlink intra-frame region information transmitted by the downlink intra-frame region transmitter; and an intra-frame region specifying information acquisition unit configured to receive the downlink frame transmitted by the downlink frame transmitter on the basis of the downlink intra-frame region information that was received by the downlink intra-frame region information receiver, and to acquire the intra-frame region specifying information contained in the downlink frame, and the base station device performs communications with each of the mobile station devices by using frame containing the communication data in the intra-frame region specified by the intra-frame region specifying information.

According to this, since the downlink intra-frame information specifies a region in a downlink containing the intra-frame region specifying information (MAP) for every mobile station device, the mobile station device no longer needs to acquire the MAP for all the mobile station devices 20, and thus the processing of the mobile station devices is reduced.

In addition, for example, even in the case where the mobile station device cannot acquire the MAP for all the mobile station devices due to frequency selective fading or the like, the mobile station device can continue communication if it can only acquire the MAP for its own device.

In addition, in the mobile communication system described above, the downlink intra-frame region specifying unit may specify a region in the downlink frame, depending on communication quality of each of the sub-channels.

According to this, since intra-frame region specifying information can be contained in an intra-frame region consisting of sub-channels of good communication quality, control of the intra-frame region containing the communication data can be performed in a stable manner.

In addition, the base station device according to the present invention is a base station device that performs communications with a plurality of mobile station devices by using a frame containing a downlink, frame consisting of multiple sub-channels comprising: a downlink intra-frame region specifying unit configured to specify a region in the downlink frame to be specified by at least the sub-channel, for each of the multiple mobile station devices; a downlink intra-frame region information transmitter configured to transmit downlink intra-frame region information to each of the mobile station devices, the downlink intra-frame region information indicating a region in the downlink frame specified by the downlink intra-frame region specifying unit; a communication data region specifying unit configured to specify a region in the frame that is to contain communication data, for each of the multiple mobile station devices; an intra-frame region specifying information generator configured to generate intra-frame region specifying information indicating the intra-frame region specified by the communication data region specifying unit; and a downlink frame transmitter configured to transmit a downlink frame containing the intra-frame region specifying information, which is generated by the intra-frame region specifying information generator, in all or a part of the downlink intra-frame region specified by the downlink intra-frame region specifying unit.

In addition, the mobile station device according to the present invention is a mobile station device that performs communications with a base station device by using a frame containing a downlink frame consisting of a plurality of sub-channels, the mobile station device comprising: a downlink intra-frame region information receiver configured to receive downlink intra-frame region information indicating a region in the downlink frame to be specified by at least the sub-channel; and an intra-frame region specifying information acquisition unit configured to receive a downlink frame transmitted by the base station device on the basis of the downlink intra-frame region information received by the downlink intra-frame region information receiver, and to acquire intra-frame region specifying information contained in the downlink frame and indicating a region in the frame that is to contain the communication data.

In addition, the mobile communication method according to the present invention is a mobile communication method for performing communications between a base station device and a plurality of mobile station devices by using a frame containing a downlink frame consisting of a plurality of sub-channels, the mobile communication method comprising: a downlink intra-frame region specification step of specifying a region in the downlink frame to be specified by at least the sub-channel, for each of the plurality of mobile station devices; a downlink intra-frame region information transmission step of transmitting downlink intra-frame region information to each of the mobile station device, the downlink intra-frame region information indicating a region in the downlink frame specified in the downlink intra-frame region specification step; a communication data region specification step of specifying a region in the frame that is to contain communication data, for each of the plurality of mobile station devices; an intra-frame region specifying information generation step of generating intra-frame region specifying information indicating the intra-frame region specified in the communication data region specification step; and a downlink frame transmission step of transmitting a downlink frame containing the intra-frame region specifying information, which is generated in the intra-frame region specifying information generation step, in all or a part of the downlink intra-frame region specified in the downlink intra-frame region specification step.

BEST MODE FOR CARRYING OUT THE INVENTION

Embodiments of the present invention will be described hereinafter with reference to drawings.

Figure 1:
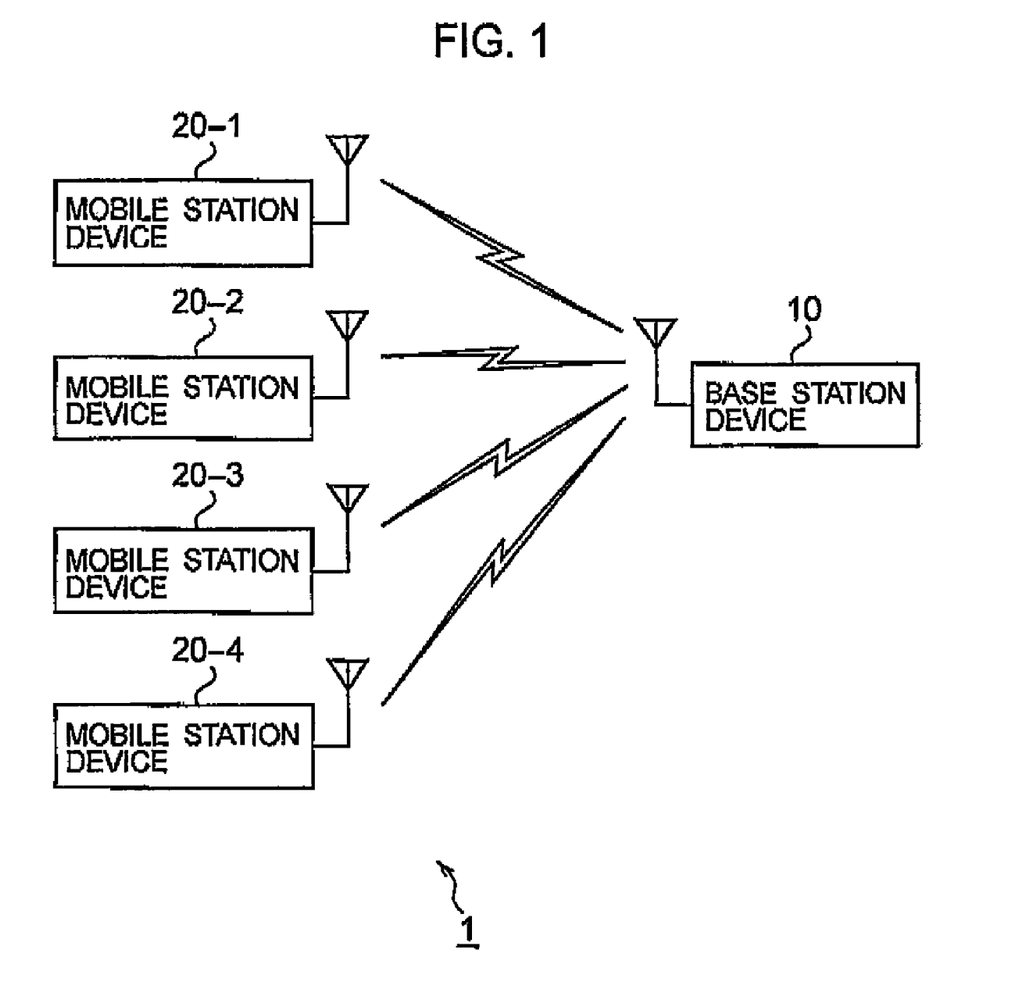
FIG. 1 is a diagram showing a system configuration of a mobile communication system according to an embodiment of the present invention.

FIG. 1 is a diagram showing a system configuration of a mobile communication system 1 according to the embodiment. The mobile communication system 1 is a next-generation PHS, and includes a base station device 10 and multiple mobile station devices 20, as shown in FIG. 1. Both the base station 10 and the multiple mobile station devices 20 are a computer equipped with a CPU and a memory. The CPU is a processing unit for executing a program stored in the memory, and not only performs processing for controlling each part of each device, but also implements each functional unit to be described later. The memory stores a program or data for carrying out the embodiment. The memory also operates as a working memory for the CPU.

In the mobile communication system 1, the following two logical channels are provided between the base station device 10 and each of the mobile station devices 20: the TCH (Traffic Channel) and the CCH (Control Channel). The base station device 10 performs not only reception/transmission of communication data with each of the mobile station devices 20 by using the TCH, but also performs reception/transmission of the control data with each of the mobile station devices 20 by using CCH.

Physically, the base station device 10 performs multiplexed communications with the multiple mobile station devices 20 by utilizing multiplex according to the TDMA (Time Division Multiple Access)/TDD schemes. Specifically, one time slot is used as the CCH for every predetermined number of time slots, while remaining time slots are used as the TCH. In time slots to be used as the TCH, a frame of the OFDMA scheme is used. As described above, the frame consists of multiple sub-channels. Additionally, the frame contains a predetermined number of symbols for every sub-channel.

Figure 2:
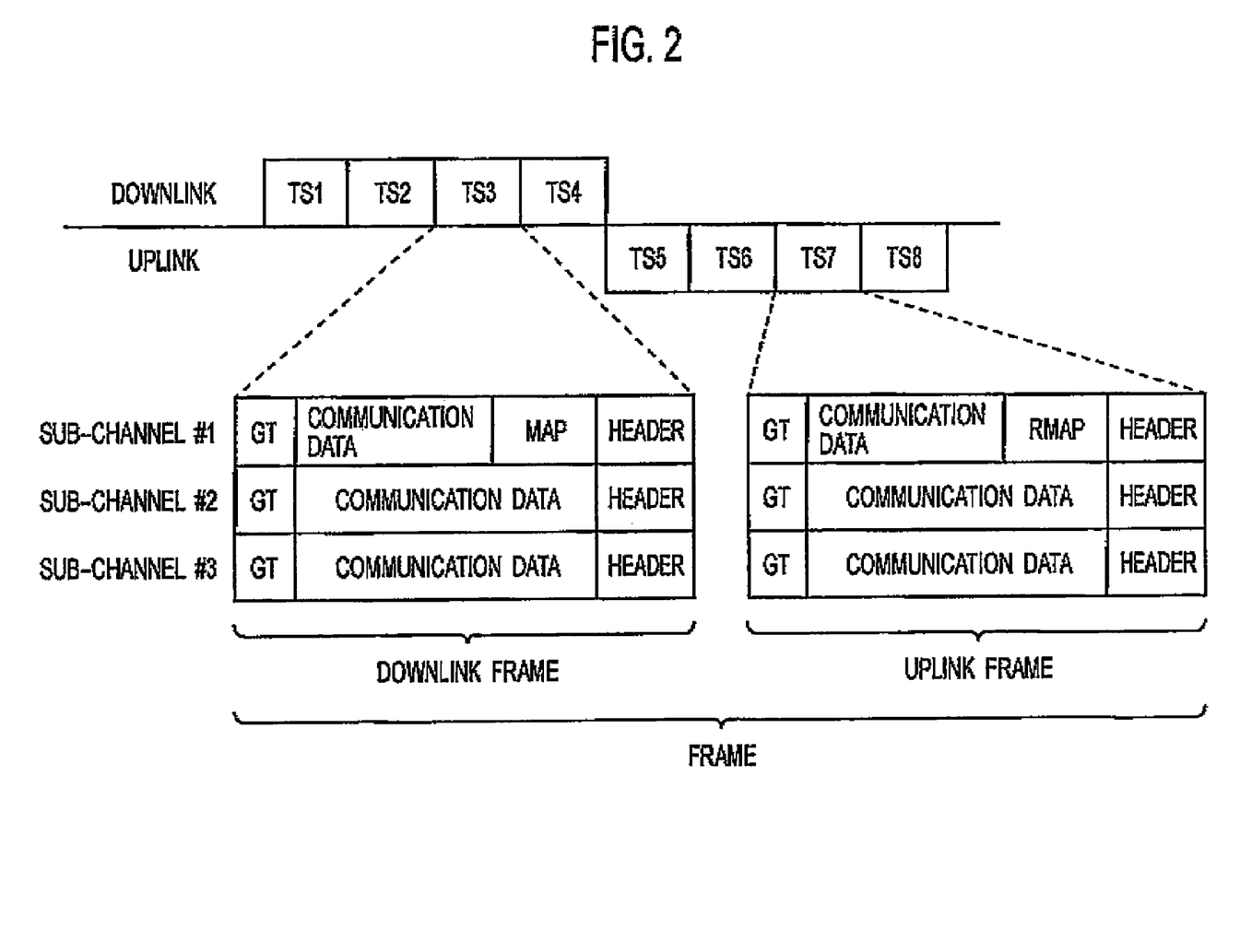
FIG. 2 is a diagram showing a frame according the embodiment of the present invention.

FIG. 2 is a diagram showing an example of the frame described above. As shown in FIG. 2, each frame consists of not only the multiple sub-channels, but also a downlink frame and an uplink frame. Each of the downlink frame and the uplink frame is transmitted and received in one time slot.

In the embodiment, for every mobile station device 20, a region in the downlink frame for containing MAP (hereinafter referred to as a MAP region) and a region in the frame for so containing communication data (hereinafter referred to as a communication data region) are provided. Here, in particular, both the MAP region and the communication data region are specified on a sub-channel basis. Accordingly, the MAP described above is contained in a region of the downlink frame, specified for every mobile station device 20. The mobile station device 20 refers to the MAP for this mobile station device 20 contained in the downlink frame, and acquires a communication data region. In addition, an RMAP (Refuse MAP) is contained in the uplink frame. The RMAP will be described later.

Details of functions of the base station device 10 and the mobile station devices 20 for implementing these will be described hereinafter.

Figure 3:
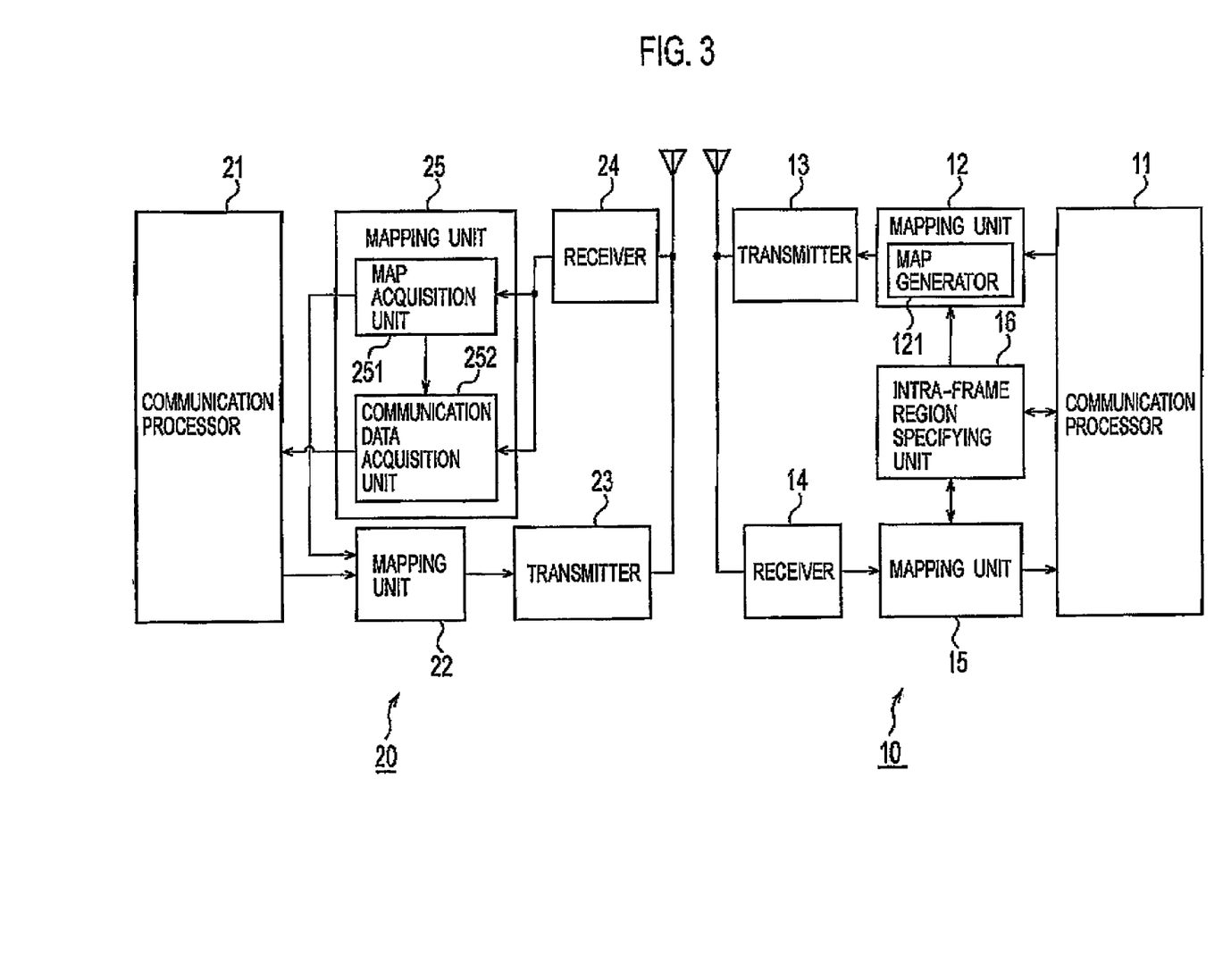
FIG. 3 is a diagram showing functional blocks of a base station device and a mobile station device according to the embodiment of the present invention.

FIG. 3 is a diagram showing functional blocks of the base station device 10 and the mobile station device 20. As shown in FIG. 3, the base station device 10 functionally includes a communication processor 11, a mapping unit 12, a transmitter 13, a receiver 14, a mapping unit 15, and an intra-frame region specifying unit 16. Further, the mapping unit 12 includes a MAP generator 121 therein. In addition, the mobile station device 20 functionally includes a communication processor 21, a mapping unit 22, a transmitter 23, a receiver 24, and a mapping unit 25. Further, the mapping unit 25 includes a MAP acquisition unit 251, and a communication data acquisition unit 252 therein.

The communication processor 21 determines start of communication, and outputs a link establishment request to the mapping unit 22. The mapping unit 22 assigns the inputted link establishment request to the CCH, and outputs it to the transmitter 23. The transmitter 23 contains the link establishment request in an uplink time slot corresponding to the CCH, and wirelessly transmits it to the base station device 10.

The receiver 14 receives the uplink time slot transmitted by the mobile station device 20, and outputs it to the mapping unit 15. The mapping unit 15 retrieves control data from those corresponding to the CCH of the inputted uplink time slots, and outputs it to the communication processor 11.

If the inputted control data contains the link establishment request described above, the communication processor 11 starts communication start process with the mobile station device 20. Specifically, the communication processor 11 instructs the intra-frame region specifying unit 16 to specify the MAP region and the communication data region.

When receiving the above instruction, the intra-frame region specifying unit 16 first acquires communication quality of each sub-channel. In a specific example, the intra-frame region specifying unit 16 acquires information indicating whether or not there is any interfering wave in each sub-channel, and information indicating whether or not each sub-channel is affected by frequency selective fading. Then, depending on the communication quality of each of the sub-channels thus acquired, the intra-frame region specifying unit 16 specifies the MAP region and the communication data region for the mobile station device 20 that transmits the link establishment request described above.

Here, in particular, the intra-frame region specifying unit 16 specifies one sub-channel from sub-channels that have not yet been used by other mobile station devices 20, depending on the communication quality of each sub-channel. The sub-channel thus specified is referred to as an anchor sub-channel. It is preferable that the intra-frame region specifying unit 16 specifies a sub-channel free from interfering wave and effect of the frequency selective fading, as an anchor sub-channel.

The intra-frame region specifying unit 16 specified the so anchor sub-channel thus specified, as the MAP region. It also specifies the same anchor sub-channel as the communication data region.

The intra-frame region specifying unit 16 outputs MAP region information (downlink intra-frame region information) indicating the specified MAP region to the communication processor 11.

The communication processor 11 transmits the MAP region information inputted from the intra-frame region specifying unit 16 to the mobile station device 20 that has transmitted the link establishment request described above. Specifically, the communication processor 11 outputs the MAP region information to the mapping unit 12. The mapping unit 12 assigns the inputted MAP region information to the CCH and outputs it to the transmitter 13. The transmitter 13 wirelessly transmits a downlink time slot containing the MAP region information to the mobile station device 20.

The receiver 24 receives the downlink time slot transmitted by the base station device 10 and outputs it to the mapping unit 25. The mapping unit 25 retrieves control data corresponding to CCH from the inputted downlink time slots, and outputs it to the communication processor 21.

If the inputted control data contains the MAP region information described above, the communication processor 21 causes the mapping unit 25 to hold the information.

By sharing the MAP region information as described above, the establishment of the link between the base station device 10 and the mobile station device 20 is completed.

When the link is established, the MAP generator 121 generates intra-frame region specifying information (MAP) that specifies a communication data region specified by the intra-frame region specifying unit 16, for every downlink frame sequentially transmitted. The mapping unit 12 assigns the MAP generated by the MAP generator 121 to a predetermined region of the MAP regions in the downlink frame, and outputs it to the transmitter 13. The transmitter 13 wirelessly transmits the downlink frame containing the MAP in the MAP region, to the mobile station device 20.

In addition, the communication processor 11 acquires communication data and outputs it to the mapping unit 12. The mapping unit 12 assigns the inputted communication data to a predetermined region (a region other than the region assigned to the MAP, for example) within communication data regions in the downlink frame, and outputs it to the transmitter 13. The transmitter 13 wirelessly transmits the downlink frame containing the communication data in the communication data region, to the mobile station device 20.

The receiver 24 receives the downlink frame transmitted by the base station device 10, and outputs it to the mapping unit 25. The MAP acquisition unit 251 first receives the downlink frame based on the MAP region information it holds, and acquires the MAP contained therein. Specifically, the MAP acquisition unit 251 acquires the MAP region from the MAP region information it holds, and acquires data contained in the MAP region in the downlink frame. Accordingly, MAP is acquired, from the thus acquired data.

Next, based on the MAP acquired by the MAP acquisition unit 251, the communication data acquisition unit 252 receives the downlink frame and acquires communication data contained therein. More specifically, the communication data acquisition unit 252 acquires a communication data region from the MAP acquired by the MAP acquisition unit 251, and acquires data contained in the communication data region in the downlink frame. Then, it acquires the communication data from the data thus acquired. The communication data acquisition unit 252 outputs the communication data thus acquired to the communication processor 21.

The communication processor 21 also acquires communication data and outputs it to the mapping unit 22. The mapping unit 22 acquires a communication data region from the MAP acquired by the MAP acquisition unit 251. Then, it assigns the communication data inputted from the communication processor 21 to a predetermined region of communication data regions in an uplink frame, and outputs it to the transmitter 23. The transmitter 23 wirelessly transmits the uplink frame containing the communication data in the communication data region to the base station device 10.

Here, the communication processor 21 acquires each communication quality of all sub-channels that the mobile station device 20 may use for communication. In a specific example, the communication processor 21 acquires information indicating whether or not there is any interfering wave in each sub-channel, and information indicating whether or not each sub-channel is affected by frequency selective fading. Then, based on the communication quality thus acquired, the communication processor 21 determines whether or not each of the sub-channels is available and generates information indicating the result (RMAP). The RMAP thus generated is contained in a predetermined region in an uplink frame (RMAP region) by the communication processor 21, and the communication processor 21 transmits the RMAP to the base station device 10. In addition, as in the example shown in FIG. 2, it is preferable to provide the predetermined region in the anchor sub-channel.

The receiver 14 receives the uplink frame transmitted by the mobile station device 20 and outputs it to the mapping unit 15. The mapping unit 15 retrieves communication data from a communication data region in the inputted uplink frame, and outputs it to the communication processor 11. The mapping unit 15 also retrieves the RMAP from the MAP region and outputs it to the intra-frame region specifying unit 16. The intra-frame region specifying unit 16 specifies a sub-channel on the basis of the RMAP. Details of the specification will be described later.

As described above, the base station device 10 performs communications with multiple mobile stations devices 20 by using a frame containing communication data specified by the intra-frame region specifying information.

Incidentally, there is a case where a communication data region is expanded or reduced, depending on amount of communication data. The expansion or the reduction will be described hereinafter.

In data communications, amount of communication data to be transmitted within a predetermined period of time may vary. If this results in delay of transmission of the communication data in the mobile station device 20, the mobile station device 20 requests the base station device 10 to expand a communication data region. On the contrary, if the amount of communication data to be transmitted is small relative to size of a communication data region, the base station device 10 reduces the communication data region.

In a specific example, the communication processor 21 determines size of a necessary communication data region (necessary band) in light of communication data amount. Then, the communication processor 21 contains necessary band notifying information (Ranging Request) for notifying a necessary band in a predetermined region in an uplink frame.

The communication processor 11 acquires the ranging request by referring to the predetermined area in the uplink frame. Then, if size of a communication data region indicated by the acquired ranging request is larger than that of a currently assigned communication data region, the communication processor 11 instructs the intra-frame region specifying unit 16 to further specify a communication data region.

Receiving the instruction described above, the intra-frame region specifying unit 16 first acquires communication quality of each sub-channel. In a specific example, the intra-frame region specifying unit 16 acquires information indicating whether or not there is any interfering wave in each sub-channel, and information indicating whether or not each of the sub-channels is affected by frequency selective fading. In addition, based on the RMAP inputted from the mapping unit 15, the intra-frame region specifying unit 16 determines whether or not each of the sub-channels is available. Then, the intra-frame region specifying unit 16 specifies a communication data region for the mobile station device 20 that transmitted the link establishment request, depending on the determination result and the acquired communication quality of each of the sub-channel described above.

Here, in particular, in addition to the anchor sub-channel, the intra-frame region specifying unit 16 specifies one sub-channel from sub channels depending on communication quality of each sub-channel, the sub-channels being determined as available and having been not used by other mobile station devices 20 yet. The sub-channel thus specified is referred to as an expanding sub-channel. It is preferable that the intra-frame region specifying unit 16 specifies a sub-channel that has no interfering wave and that is not affected by the frequency selective fading, as the expanding sub-channel.

The intra-frame region specifying unit 16 specifies the thus specified expanding sub-channel as a communication data region. As a result of the specification, MAP to be generated by the MAP generator 121 contains both the communication data region related to the anchor sub-channel and the communication data region related to the expanding sub-channel. Then, both of so the communication data regions are used for reception and transmission of communication data.

In contrast, if size of a communication data region indicated by the acquired ranging request is smaller than that of the currently assigned communication data region by a predetermined amount, the communication processor 11 instructs the intra-frame region specifying unit 16 to reduce the communication data region.

Receiving the above instruction, the intra-frame region specifying unit 16 specifies a communication data region again so that the communication data region to be specified is reduced, compared with the currently assigned communication data region. In this case, if the intra-frame region specifying unit 16 has specified the expanding sub-channel as a communication data region, it is preferable that it preferentially make the expanded channel as a target of reduction over the anchor sub-channel. As a result of the processing described above, the communication data region will be reduced.

In the above description, the expansion or the reduction of the communication data region depending on amount of the communication data to be transmitted by the mobile station 20 is described. The communication data region is similarly expanded or reduced, depending on amount of communication data to be transmitted by the base station device 10 as well.

Figure 4:
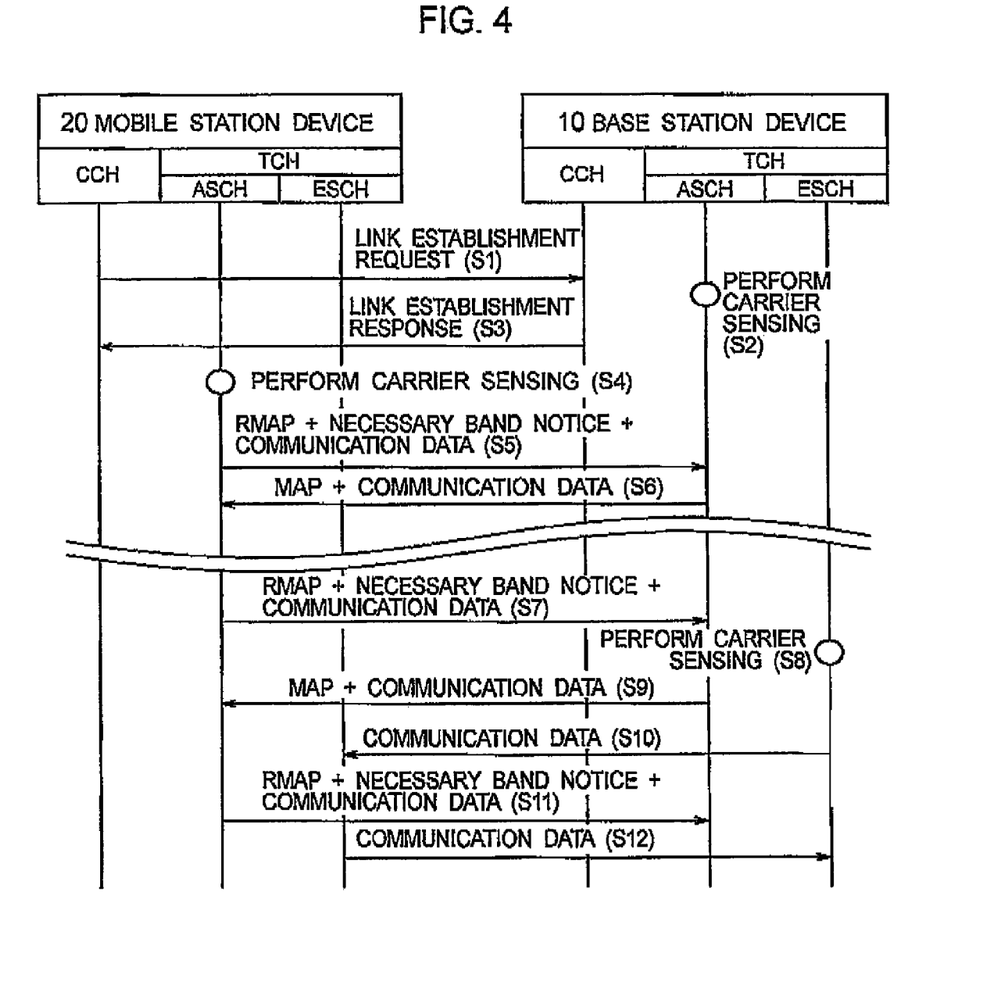
FIG. 4 is a diagram showing processing sequence of the mobile communication system according to the embodiment of the present invention.

Each function of the base station device 10 and the mobile station device 20 as described above will be described again in detail with reference to the processing sequence diagram.

FIG. 4 is a diagram showing processing sequence of the mobile communication system 1. As shown in FIG. 4, the mobile station device 20 attempting to start communication first transmits a link establishment request to the base station device 10 by the CCH (S1).

Receiving the link establishment request, the base station device 10 performs carrier sensing (S2). In other words, the base station device 10 specifies one sub-channel (anchor sub-channel) depending on communication quality of each sub-channel. Then, the base station device 10 specifies the anchor sub-channel as a MAP region and a communication data region, and transmits the link establishment response containing MAP region information indicating the specified MAP region, to the mobile station device 20 (S3). This establishes the link.

Receiving the link establishment response, the mobile station device 20 checks whether or not there is interfering wave or frequency selective fading to determine whether or not the anchor sub-channel is available. If it is not available, the mobile station device 20 requests the base station device 10 to specify the anchor sub-channel again (not shown). In contrast, if the anchor sub-channel is available, the mobile station device 20 transmits an uplink frame containing the anchor sub-channel that includes RMAP, necessary band notice, and communication data, to the base station device 10 (S5). In addition, the base station device 10 transmits a downlink frame containing the anchor sub-channel that contains the MAP and the communication data, to the mobile station device 20 (S6). Subsequently, processing of S5 and S6 is repeated.

Now, assume that amount of the communication data transmitted by the mobile station device 20 exceeds a predetermined value. Then, the mobile station device 20 transmits an uplink frame containing the anchor sub-channel that contains a necessary band notice indicating a communication data region that is larger than before, to the base station device 10 (S7). Receiving the uplink frame, the base station device 10 performs carrier sensing (S8). In other words, the base station device 10 specifies one sub-channel (expanding sub-channel) as a communication data region, depending on communication quality of each sub-channel. Subsequently, the base station device 10 transmits a downlink frame containing the anchor sub-channel and the expanding sub-channel to the mobile station device 20 (S9, S10). The anchor sub-channel contains the MAP and the communication data. In addition, the expanding sub-channel contains the communication data. Similarly, the mobile station device 20 transmits an uplink frame containing the anchor sub-channel and the expanding sub-channel to the base station device 10 (S11, S12). The anchor sub-channel contains the RMAP, the necessary band notice and the communication data. The expanding sub-channel contains the communication data.

As described above, according to the mobile communication system 1, since MAP region information specifies an intra-frame region containing MAP for every mobile station device 20, the mobile station device no longer needs to acquire MAP for all the mobile station devices 20, and thus the processing of the mobile station device 20 is reduced.

In addition, even in the case in which each of the mobile station devices 20 cannot acquire MAP for all the mobile station devices 20 due to frequency selective fading, etc., the mobile station device 20 can continue communication only by acquiring MAP for the mobile station device 20 itself.

Further, the mobile station device 20 can contain MAP in an intra-frame area consisting of sub-channels with good to communication quality (anchor sub-channel). Accordingly, size of a communication data region can be controlled stably, and available sub-channels can be notified in real time.

In addition, since a MAP region is specified for every mobile station device 20, each of the mobile station devices 20 cannot acquire MAP for other mobile station devices 20. In other words, as it is impossible for each of the mobile station devices 20 to know a communication data region of the other mobile station devices 20, confidentiality of communications improves.

Additionally, the present invention is not limited to the above embodiment. For example, in the above embodiment, the anchor sub-channel is specified when communication starts. However, it may be changed as appropriate based on RMAP. It is preferable for the base station device that made this change to transmit the MAP region information again to the mobile station device.

In addition, in the above embodiment, both the MAP region and the communication data region are specified on a sub-channel basis. However, the intra-frame region specifying unit 16 may specify all or a part of the regions in the anchor sub-channel as the MAP region, and also specify, as the communication data region, all or a part of the regions in the anchor sub-channel other than those specified as the MAP region and all or a part of the regions in the expanding sub-channel. Since this could implement meticulous region specification, a degree of freedom in the region specification can be increased.

Japanese Patent Application No. 2006-206022 (filed on Jul. 28, 2006) is incorporated herein by reference in its entirety.

INDUSTRIAL APPLICABILITY

As described above, in the mobile communication system according to the present invention, downlink intra-frame information specifies a region in a downlink frame containing intra-frame region specifying information (MAP) for every mobile station device. Thus, the mobile communication system according to the present invention does not need to perform operation of acquiring MAP for the mobile station itself after the mobile station device acquires MAP once for all mobile station devices. Such mobile communication system is widely useful in radio communications such as mobile communication or the like.

The invention claimed is:

1. A mobile communication system in which a base station device and a plurality of mobile station devices perform communications by using a frame containing a downlink frame consisting of a plurality of sub-channels, wherein
the base station device comprises:
a downlink intra-frame region specifying unit configured to specify a region in the downlink frame to be specified by at least the sub-channel, for each of the plurality of mobile station devices, wherein the downlink intra-frame region specifying unit specifies the region in the downlink frame, depending on communication quality of each of the sub-channels;
a downlink intra-frame region information transmitter configured to transmit downlink intra-frame region information to each of the mobile station device, the downlink intra-frame region information indicating a region in the downlink frame specified by the downlink intra-frame region specifying unit;

a communication data region specifying unit configured to specify a region in the frame that is to contain communication data, for each of the plurality of mobile station devices;

an intra-frame region specifying information generator configured to generate intra-frame region specifying information indicating the intra-frame region specified by the communication data region specifying unit; and a downlink frame transmitter configured to transmit a downlink frame containing the intra-frame region specifying information, which is generated by the intra-frame region specifying information generator, in all or a part of the downlink intra-frame region specified by the downlink intra-frame region specifying unit;

each of the mobile station devices comprises:

a downlink intra-frame region information receiver configured to receive the downlink intra-frame region information transmitted by the downlink intra-frame region information transmitter; and an intra-frame region specifying information acquisition unit configured to receive the downlink frame transmitted by the downlink frame transmitter on the basis of the downlink intra-frame region information received by the downlink intra-frame region information receiver, and to acquire the intra-frame region specifying information contained in the downlink frame, and the base station device performs communications with each of the mobile station devices by using a frame containing communication data in the intra-frame region specified by the intra-frame region specifying information.

2. A base station device for performing communications with a plurality of mobile station devices by using a frame containing a downlink frame consisting of multiple sub-channels, the base station device comprising:

a downlink intra-frame region specifying unit configured to specify a region in the downlink frame to be specified by at least the sub-channel, for each of the plurality of mobile station devices, wherein the downlink intra-frame region specifying unit specifies the region in the downlink frame, depending on communication quality of each of the sub-channels;

a downlink intra-frame region information transmitter configured to transmit downlink intra-frame region information to each of the mobile station devices, the downlink intra-frame region information indicating a region in the downlink frame specified by the downlink intra-frame region specifying unit;

a communication data region specifying unit configured to specify a region in the frame that is to contain communication data, for each of the plurality of mobile station devices;

an intra-frame region specifying information generator configured to generate an intra-frame region specifying information indicating the intra-frame region specified by the communication data region specifying unit; and a downlink frame transmitter configured to transmit a downlink frame containing the intra-frame region specifying information, which is generated by the intra-frame region specifying information generator, in all or a part of the downlink intra-frame region specified by the downlink intra-frame region specifying unit.

3. A mobile station device for performing communications with a base station device by using a frame containing a downlink frame consisting of a plurality of sub-channels, the mobile station device comprising:

a downlink intra-frame region information receiver configured to receive downlink intra-frame region information indicating a region in the downlink frame to be specified by at least the sub-channel, wherein the region in the downlink frame depends on a communication quality of each of the sub-channels; and an intra-frame region specifying information acquisition unit configured to receive the downlink frame transmitted by the base station device on the basis of the downlink intra-frame region information received by the downlink intra-frame region information receiver, and to acquire intra-frame region specifying information contained in the downlink frame and indicating a region in the frame that is to contain communication data.

4. A mobile communication method for performing communication between a base station device and a plurality of mobile station devices by using a frame containing a downlink frame consisting of a plurality of sub-channels, the mobile communication method comprising:

a downlink intra-frame region specification step of specifying a region in the downlink frame to be specified by at least the sub-channel, for each of the plurality of mobile station devices, wherein the region in the downlink frame depends on a communication quality of each of the sub-channels;

a downlink intra-frame region information transmission step of transmitting downlink intra-frame region information to each of the mobile station device, the downlink intra-frame region information indicating a region in the downlink frame specified in the downlink intra-frame region specification step;

a communication data region specification step of specifying a region in the frame that is to contain communication data, for each of the plurality of mobile station devices;

an intra-frame region specifying information generation step of generating intra-frame region specifying information indicating the intra-frame region specified in the communication data region specification step; and a downlink frame transmission step of transmitting a downlink frame containing the intra-frame region specifying information, which is generated in the intra-frame region specifying information generation step, in all or a part of the downlink intra-frame region specified in the downlink intra-frame region specification step.

* * * * *